(12) United States Patent
Kimoto

(10) Patent No.: US 8,223,840 B2
(45) Date of Patent: Jul. 17, 2012

(54) IMAGE DECODING METHOD OF DECODING HIERARCHY-ENCODED IMAGE DATA IN RESPECTIVE HIERARCHIES, AND A DEVICE THEREOF

(75) Inventor: Takahiro Kimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 1267 days.

(21) Appl. No.: 11/919,399

(22) PCT Filed: Apr. 25, 2006

(86) PCT No.: PCT/JP2006/308657
§ 371 (c)(1),
(2), (4) Date: Oct. 26, 2007

(87) PCT Pub. No.: WO2006/118114
PCT Pub. Date: Nov. 9, 2006

(65) Prior Publication Data
US 2009/0304074 A1    Dec. 10, 2009

(30) Foreign Application Priority Data
Apr. 27, 2005    (JP) .................................. 2005-130410

(51) Int. Cl.
*H04N 7/12*    (2006.01)
(52) U.S. Cl. ............... 375/240.12; 375/240.25; 382/233
(58) Field of Classification Search ............. 375/240.01, 375/240.03, 240.12–240.17; 382/233, 234, 382/238
See application file for complete search history.

(56) References Cited

U.S. PATENT DOCUMENTS

| | | | |
|---|---|---|---|
| 5,963,257 A | 10/1999 | Katata et al. | |
| 5,986,708 A | 11/1999 | Katata et al. | |
| 6,020,923 A * | 2/2000 | Hosaka et al. | 375/240.12 |
| 6,023,299 A | 2/2000 | Katata et al. | |
| 6,023,301 A | 2/2000 | Katata et al. | |
| 6,084,914 A | 7/2000 | Katata et al. | |
| 6,088,061 A | 7/2000 | Katata et al. | |
| 6,198,770 B1 * | 3/2001 | Kondo | 375/240.14 |
| 6,798,834 B1 * | 9/2004 | Murakami et al. | 375/240.12 |
| 6,973,131 B2 | 12/2005 | Yoshigahara | |
| 7,126,989 B2 | 10/2006 | Hagai et al. | |
| 7,272,263 B2 | 9/2007 | Okada | |
| 2002/0064230 A1 | 5/2002 | Yoshigahara | |
| 2002/0154823 A1 | 10/2002 | Okada | |

(Continued)

FOREIGN PATENT DOCUMENTS

JP    7-203426    8/1995

(Continued)

*Primary Examiner* — Ricky Ngo
*Assistant Examiner* — Kan Yuen
(74) *Attorney, Agent, or Firm* — Foley & Lardner LLP

(57) ABSTRACT

A lower hierarchical decoder (100) decodes lower hierarchical data (1001), and creates a prediction error signal (1004). A switch (107) accepts a decode hierarchical instruction signal (1100) indicating which of the upper and lower hierarchies a hierarchical image decoding device decodes, and switches a prediction decode processing. In case the lower hierarchy is decoded, the switch (107) inputs a lower decoded signal (1009) as an output to a prediction decode unit (105), and creates a lower hierarchical decoded image (1008). In case the upper hierarchy is outputted, the switch (107) inputs the lower decoded signal (1009) to a pseudo prediction decode unit (106), and creates a lower hierarchical decoded image (1009). An upper hierarchical decoder (200) inputs upper image data (2001), and creates an upper hierarchical decoded image (2008) with reference to the lower hierarchical decoded image (1009).

15 Claims, 4 Drawing Sheets

U.S. PATENT DOCUMENTS

| | | |
|---|---|---|
| 2003/0095603 A1 | 5/2003 | Lan et al. |
| 2004/0032908 A1 | 2/2004 | Hagai et al. |
| 2006/0188017 A1 | 8/2006 | Hagai et al. |
| 2006/0239350 A1 | 10/2006 | Hagai et al. |
| 2006/0239351 A1 | 10/2006 | Hagai et al. |
| 2006/0239352 A1 | 10/2006 | Hagai et al. |

FOREIGN PATENT DOCUMENTS

| | | |
|---|---|---|
| JP | 8-018965 | 1/1996 |
| JP | 9-027260 | 2/1997 |
| JP | 9-037260 A | 2/1997 |
| JP | 2001-238210 A | 8/2001 |
| JP | 2002-164790 A | 6/2002 |
| JP | 2002-232881 A | 8/2002 |
| JP | 2002-325257 A | 11/2002 |
| JP | 2003-179933 A | 6/2003 |
| JP | 2003-527004 A | 9/2003 |
| JP | 2005-510150 A | 4/2005 |
| WO | WO 01/69935 A1 | 9/2001 |
| WO | WO 02/39750 A2 | 5/2002 |
| WO | WO 03/043344 A2 | 5/2003 |

* cited by examiner

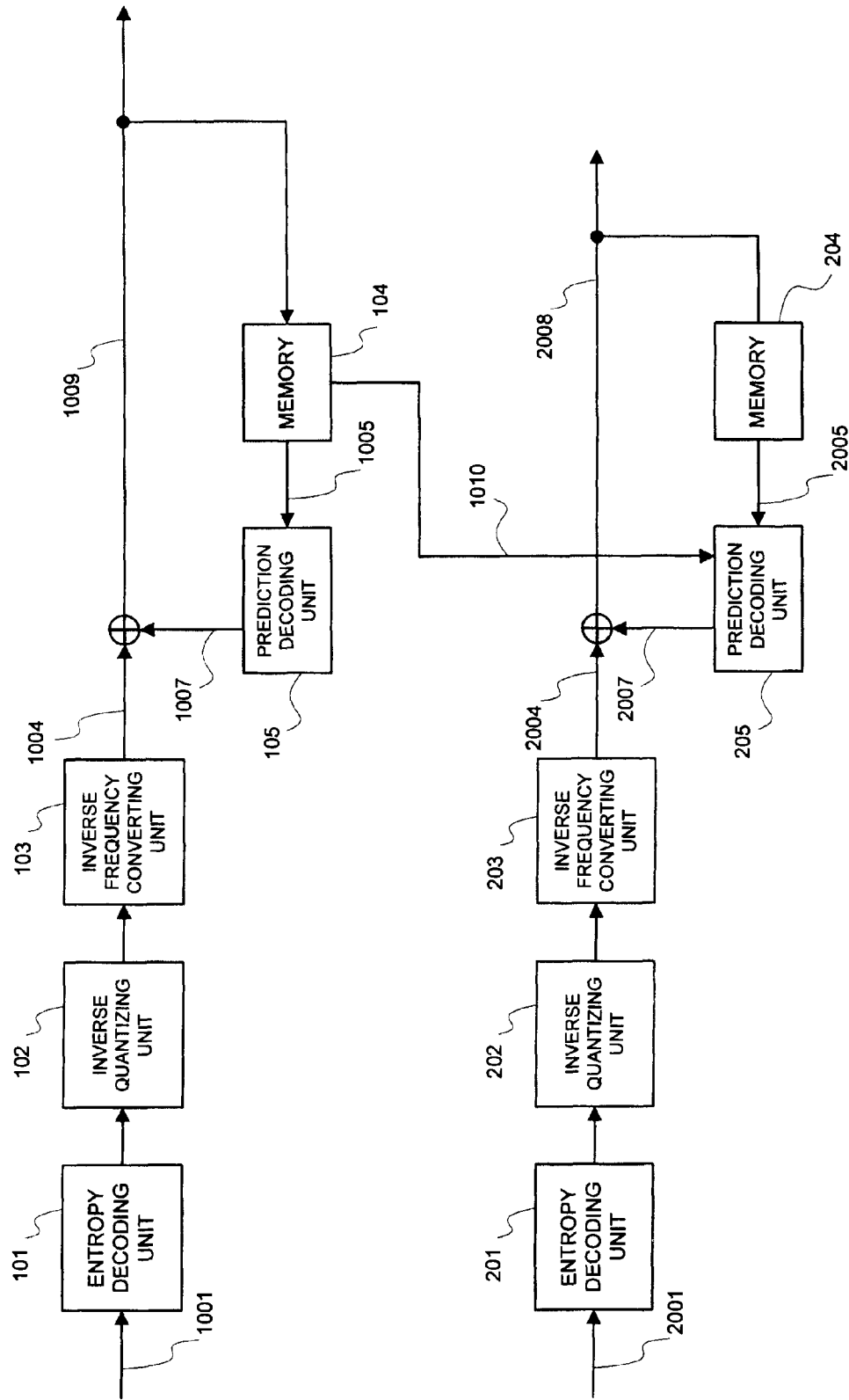

IMAGE DECODING METHOD OF DECODING HIERARCHY-ENCODED IMAGE DATA IN RESPECTIVE HIERARCHIES, AND A DEVICE THEREOF

APPLICABLE FIELD IN THE INDUSTRY

The present invention relates to an image decoding method and device for decoding image data, and more particularly to an image decoding method for decoding hierarchy-encoded image data in respective hierarchies, a device therefore, and a program thereof.

BACKGROUND ART

The so-called hierarchy encoding signifies a technology of hierarchically encoding image data in an order of coarse information to fine information. Encoding an image hierarchically makes it possible to cope with terminals each having a different display resolution and a different a transfer environment on the condition alone that partial addition/deletion is performed for one piece of compressed data. It is thinkable that with a development in Internet, and diversity of an image reproduction environment, the technology of hierarchically encoding an image becomes of importance increasingly.

On the other hand, so as to realize a high-efficient image encoding, the prediction decoding process, which is performed by making a reference to surrounding pixels, becomes complicated increasingly. The movement compensation prediction in the latest international standard of the moving image coding scheme, namely, H.264/MPEG-4AVC differs in the following points as compared to that of MPEG-2.

(1) A block, which becomes a unit for a compensating process, can be sub-divided into 4 times 4 blocks.

(2) A precision of movement information can be fined at a level of being as fine as one-fourth of a pixel or so.

(3) A filter for interpolating a pixel value at a decimal point, which is a six-tap filter, is lengthened.

Further, with the process of, in intra-frame coding, predicting an intra-block pixel value from the neighboring pixels, H.264/MPEG-4AVC adopts the process of not only copying the pixel value in a longitudinal direction and a traverse direction, but also interpolating the pixel value in an oblique direction.

In FIG. 4, a configuration is shown of the hierarchical image decoding device in a pyramidal coding scheme, being a general technique of the hierarchy encoding, which is adopted in MPEG-2 as well.

At first, an entropy decoding unit 101, an inverse quantizing unit 102, and an inverse frequency converting unit 103 perform a process for lower hierarchical data 1001, respectively, and create a prediction error signal 1004. A prediction decoding unit 105 performs a prediction decoding process by making a reference to a lower hierarchical decoded image 1005 filed into a memory 104, and creates a prediction signal 1007. The prediction signal 1007 and the prediction error signal 1004 are added and a lower hierarchical decoded image 1009 is created. The lower hierarchical decoded image 1009, which is filed in the memory 104, is employed for later decoding.

Next, an entropy decoding unit 201, an inverse quantizing unit 202, and an inverse frequency converting unit 203 perform a process for upper hierarchical encoding data 2001, respectively, and create a prediction error signal 2004. A prediction decoding unit 205 performs a prediction decoding process by making a reference to a lower hierarchical decoded image 1010 filed into the memory 104, and an upper hierarchical decoded image 2005 filed into a memory 204, and creates a prediction signal 2007. The prediction signal 2007 and the prediction error signal 2004 are added, and an upper hierarchical decoded image 2008 is created. The upper hierarchical decoded image 2008, which is filed in the memory 204, is employed for later decoding.

DISCLOSURE OF THE INVENTION

Problems to be Solved by the Invention

However, the problem of the prior art shown in FIG. 4 lies in a point that a processing quantity is much. That is, in a process of decoding an image, the prediction decoding process demands much processing quantity. In the conventional prior art, the prediction decoding process is performed not only in an upper hierarchy but also in a lower hierarchy at the time of decoding the upper hierarchy. For this, it follows that more processing quantity is demanded as compare with the case of decoding the image data that has not been hierarchized.

Thereupon, the present invention has been accomplished in consideration of the above-mentioned problems, and an object thereof is to provide an image decoding method of a hierarchical image, which enables the processing quantity at the time of decoding the higher hierarchy to be reduced, and a device therefore, and a program thereof.

Means for Solving the Problems

The 1st invention for solving the above-mentioned task, which is an image decoding method of decoding hierarchized image data, characterized in: in decoding a lower hierarchy, performing a prediction decoding process by making a reference to already-decoded image data, and adding a created prediction signal and a prediction error signal to create a first lower hierarchical decoded image; and in decoding an upper hierarchy, performing a pseudo prediction decoding process, being a process obtained by simplifying said prediction decoding process, by making a reference to said already-decoded image data, and adding a created pseudo prediction signal and said prediction error signal to create a second lower hierarchical decoded image, and thereafter decoding upper hierarchical decoding data by making a reference to said second lower hierarchical decoded image.

The 2nd invention for solving the above-mentioned problem, in the above-mentioned 1st invention, is characterized in that the prediction decoding process is a process of performing movement compensation prediction decoding by making a reference to a reference frame, being an already-decoded image frame, and movement information indicating a migration quantity for each block between a frame that becomes an object of decoding, and said reference frame.

The 3rd invention for solving the above-mentioned problem, in the above-mentioned 1st invention, is the prediction decoding process is a process of performing movement compensation prediction decoding by making a reference to a reference frame, being an already-decoded image frame, and movement information indicating a migration quantity for each block between a frame that becomes an object of decoding, and said reference frame; and the pseudo prediction decoding process is a process of, after rounding off movement information indicating a decimal pixel position to an integral pixel position, performing movement compensation prediction decoding.

The 4th invention for solving the above-mentioned problem, in the above-mentioned 1st invention, is characterized in that: the prediction decoding process is a process of performing movement compensation prediction decoding by making a reference to a reference frame, being an already-decoded image frame, and movement information indicating a migration quantity for each block between a frame that becomes an object of decoding, and said reference frame; and the pseudo prediction decoding process is a process of employing an interpolation filter having a shorter tap length instead of a pixel value interpolation filter in the movement compensation prediction decoding.

The 5th invention for solving the above-mentioned problem, in the above-mentioned 1st invention, is characterized in that the prediction decoding process is a process of performing a pixel value interpolating process for a block, which becomes an object of decoding, by making a reference to pixels neighboring said block, creating an interpolated pixel value, and copying said interpolated pixel value into said block.

The 6th invention for solving the above-mentioned problem, in the above-mentioned 1st invention, is characterized in that: the prediction decoding process is a process of performing a pixel value interpolating process for a block, which becomes an object of decoding, by making a reference to pixels neighboring said block, creating an interpolated pixel value, and copying said interpolated pixel value into said block; and the pseudo prediction decoding process is a process of employing another pixel value interpolating process of which an arithmetic operation quantity is fewer instead of the pixel value interpolating process.

The 7th invention for solving the above-mentioned task, which is a hierarchical image decoding method of decoding hierarchized image data, said image decoding method comprising: a step of filing a lower hierarchical decoded image into a first memory; a first entropy decoding step of entropy-decoding lower hierarchical data: a first inverse quantizing step of inverse-quantizing an output of said first entropy decoding step; a first inverse frequency converting step of performing an inverse frequency conversion for an output of said first inverse quantizing step, and creating a first prediction error signal; a first prediction decoding step of performing a prediction decoding process by making a reference to the lower hierarchical decoded image filed into said first memory and first additional information, and creating a first prediction signal; a pseudo prediction decoding step of performing a pseudo prediction decoding process, being a process obtained by simplifying said prediction decoding process, by making a reference to the lower hierarchical decoded image filed into said first memory and said first additional information, and creating a pseudo prediction signal; a first switching step of selecting any of said first prediction decoding step and said pseudo prediction decoding step for said lower hierarchical decoded image by making a reference to a decoding hierarchy instruction signal for giving an instruction as to which of the upper and lower hierarchies is decoded; a second switching step of selecting any of said first prediction decoding step and said pseudo prediction decoding step for said additional information by making a reference to said decoding hierarchy instruction signal; a first adding step of adding one of said first prediction signal and said pseudo prediction signal, and said first prediction error signal, and creating a lower hierarchical decoded image; a step of filing an upper hierarchical decoded image into a second memory; a second entropy decoding step of entropy-decoding upper hierarchical data: a second inverse quantizing step of inverse-quantizing an output of said second entropy decoding step; a second inverse frequency converting step of performing an inverse frequency conversion for an output of said second inverse quantizing step, and creating a second prediction error signal; a second prediction decoding step of performing a prediction decoding process by making a reference to the lower hierarchical decoded image filed into said first memory, the upper hierarchical decoded image filed into said second memory and second additional information, and creating a second prediction signal; and a second adding step of adding said second prediction signal and said second prediction error signal, and creating an upper hierarchical decoded image, characterized in: in a case of assuming the lower hierarchical image to be an output image, performing said first prediction decoding step; and in a case of assuming the upper hierarchical image to be an output image, performing said pseudo prediction decoding step, creating an lower hierarchical pseudo decoded image, and making a reference to said lower hierarchical pseudo decoded image in the upper hierarchical decoding process.

The 1st invention for solving the above-mentioned task, which is an image decoding device for decoding hierarchized image data, characterized in comprising: a means for, in decoding a lower hierarchy, performing a prediction decoding process by making a reference to already-decoded image data, and adding a created prediction signal and a prediction error signal to create a first lower hierarchical decoded image; and a means for, in decoding an upper hierarchy, performing a pseudo prediction decoding process, being a process obtained by simplifying said prediction decoding process, by making a reference to said already-decoded image data, adding a created pseudo prediction signal and said prediction error signal to create a second lower hierarchical decoded image, and thereafter decoding upper hierarchical decoding data by making a reference to said second lower hierarchical decoded image.

The 9th invention for solving the above-mentioned problem, in the above-mentioned 8th invention, is characterized in that the prediction decoding process is a process of performing movement compensation prediction decoding by making a reference to a reference frame, being an already-decoded image frame, and movement information indicating a migration quantity for each block between a frame that becomes an object of decoding, and said reference frame.

The 10th invention for solving the above-mentioned problem, in the above-mentioned 8th invention, is characterized in that: the prediction decoding process is a process of performing movement compensation prediction decoding by making a reference to a reference frame, being an already-decoded image frame, and movement information indicating a migration quantity for each block between a frame that becomes an object of decoding, and said reference frame; and the pseudo prediction decoding process is a process of, after rounding off movement information indicating a decimal pixel position to an integral pixel position, performing movement compensation prediction decoding.

The 11th invention for solving the above-mentioned problem, in the above-mentioned 8th invention, is characterized in that: the prediction decoding process is a process of performing movement compensation prediction decoding by making a reference to a reference frame, being an already-decoded image frame, and movement information indicating a migration quantity for each block between a frame that becomes an object of decoding, and said reference frame; and the pseudo prediction decoding process is a process of employing an interpolation filter having a shorter tap length instead of a pixel value interpolation filter in the movement compensation prediction decoding.

The 12th invention for solving the above-mentioned problem, in the above-mentioned 8th invention, is characterized in that the prediction decoding process is a process of performing a pixel value interpolating process for a block, which becomes an object of decoding, by making a reference to pixels neighboring said block, creating an interpolated pixel value, and copying said interpolated pixel value into said block.

The 13th invention for solving the above-mentioned problem, in the above-mentioned 8th invention, is characterized in that: the prediction decoding process is a process of performing a pixel value interpolating process for a block, which becomes an object of decoding, by making a reference to pixels neighboring said block, creating an interpolated pixel value, and copying said interpolated pixel value into said block; and the pseudo prediction decoding process is a process of employing another pixel value interpolating process of which an arithmetic operation quantity is fewer instead of the pixel value interpolating process.

The 14th invention for solving the above-mentioned task, which is a hierarchical image decoding device for decoding hierarchized image data, said image decoding device comprising: a first memory for filing a lower hierarchical decoded image; a first entropy decoding means for entropy-decoding lower hierarchical data: a first inverse quantizing means for inverse-quantizing an output of said first entropy decoding means; a first inverse frequency converting means for performing an inverse frequency conversion for an output of said first inverse quantizing means, and creating a first prediction error signal; a first prediction decoding means for performing a prediction decoding process by making a reference to the lower hierarchical decoded image filed into said first memory and first additional information, and creating a first prediction signal; a pseudo prediction decoding means for performing a pseudo prediction decoding process, being a process obtained by simplifying said prediction decoding process, by making a reference to the lower hierarchical decoded image filed into said first memory and said first additional information, and creating a pseudo prediction signal; a first switching means for inputting said lower hierarchical decoded image into one of said first prediction decoding means and said pseudo prediction decoding means by making a reference to a decoding hierarchy instruction signal for giving an instruction as to which of the upper and lower hierarchies is decoded; a second switching means for inputting said additional information into one of said first prediction decoding means and said pseudo prediction decoding means by making a reference to said decoding hierarchy instruction signal; a first adding means for adding one of said first prediction signal and said pseudo prediction signal, and said first prediction error signal, and creating a lower hierarchical decoded image; a second memory for filing upper hierarchical decoded image; a second entropy decoding means for entropy-decoding upper hierarchical data: a second inverse quantiziting means for inverse-quantizing an output of said second entropy decoding means; a second inverse frequency converting means for performing an inverse frequency conversion for an output of said second inverse quantizing means, and creating a second prediction error signal; a second prediction decoding means for performing a prediction decoding process by making a reference to the lower hierarchical decoded image filed into said first memory, the upper hierarchical decoded image filed into said second memory and second additional information, and creating a second prediction signal; and a second adding means for adding said second prediction signal and said second prediction error signal, and creating an upper hierarchical decoded image, characterized in that: in a case of assuming the lower hierarchical image to be an output image, said first prediction decoding means performs a process; and in a case of assuming the upper hierarchical image to be an output image, said pseudo prediction decoding means performs a process to create an lower hierarchical pseudo decoded image, and makes a reference to said lower hierarchical pseudo decoded image in the upper hierarchical decoding process.

The 15th invention for solving the above-mentioned task, which is a program of an image decoding device for decoding hierarchized image data, characterized in causing said image decoding device to execute: a process of, in decoding a lower hierarchy, performing a prediction decoding process by making a reference to already-decoded image data, and adding a created prediction signal and a prediction error signal to create a first lower hierarchical decoded image; and a process of, in decoding an upper hierarchy, performing a pseudo prediction decoding process, being a process obtained by simplifying said prediction decoding process, by making a reference to said already-decoded image data, adding a created pseudo prediction signal and said prediction error signal to create a second lower hierarchical decoded image, and thereafter decoding upper hierarchical decoding data by making a reference to said second lower hierarchical decoded image.

Effect of the Invention

In accordance with the present invention, the usual prediction decoding process is performed in a case of outputting the lower hierarchical decoded image, and the prediction decoding process in the lower hierarchy is simplified in a case of outputting the upper hierarchical decoded image. This makes it possible to reduce the processing quantity that is required for the prediction decoding process in decoding the upper hierarchy.

BRIEF DESCRIPTION OF THE DRAWINGS

FIG. 4 is a block diagram illustrating a configuration of the conventional hierarchical image decoding device.

Figure 1:
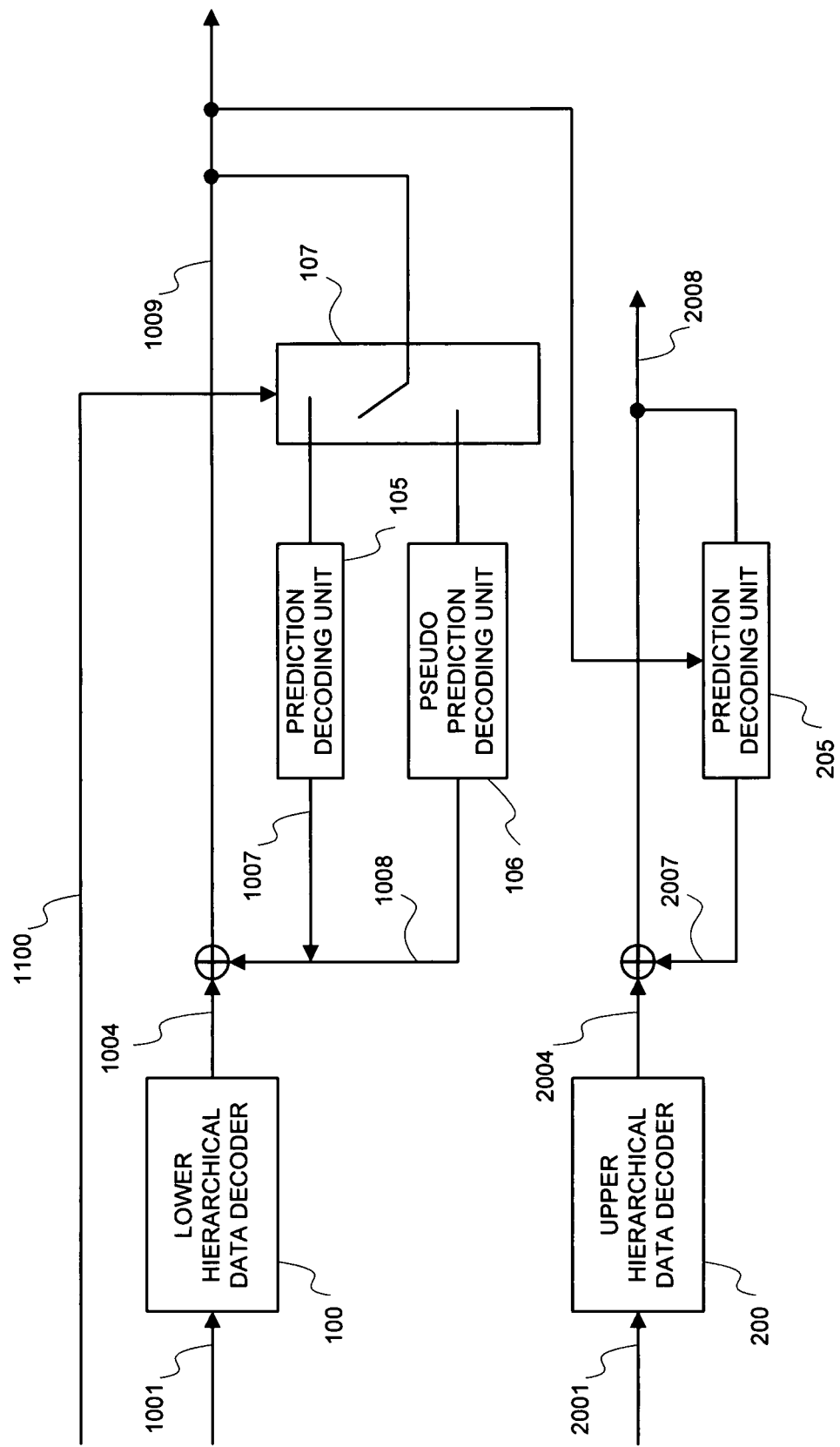
FIG. 1 is a block diagram illustrating a configuration of the best mode for carrying out the present invention.

DESCRIPTION OF NUMERALS 100 lower hierarchical decoder
200 upper hierarchical decoder
101 and 201 entropy decoding units
102 and 202 inverse quantizing units
103 and 203 inverse frequency converting units
104 and 204 memories
105 and 205 prediction decoding units
106 pseudo prediction decoding unit
107 and 108 switches
1001 lower hierarchical data
1002 quantization coefficient signal
1003 coefficient signal
1004 and 2004 prediction error signals
1005, 1009, and 1010 lower hierarchical decoded images
1006 and 2006 additional information
1007 and 2007 prediction signals
1008 prediction signal
1100 decoding hierarchy instruction signal 2001 upper hierarchical data
2008 upper hierarchical decoded image

BEST MODE FOR CARRYING OUT THE INVENTION

The best mode for carrying out the first invention of the present invention will be explained by employing the accompanied drawings.

FIG. 1 is a block diagram illustrating a configuration of the image decoding device, being a first embodiment of the present invention.

The hierarchical image decoding device in the present invention is comprised of a lower hierarchical data decoder 100, an upper hierarchical data decoder 200, prediction decoding units 105 and 205, a pseudo prediction decoding unit 106, and a switch 107.

Figure 2:
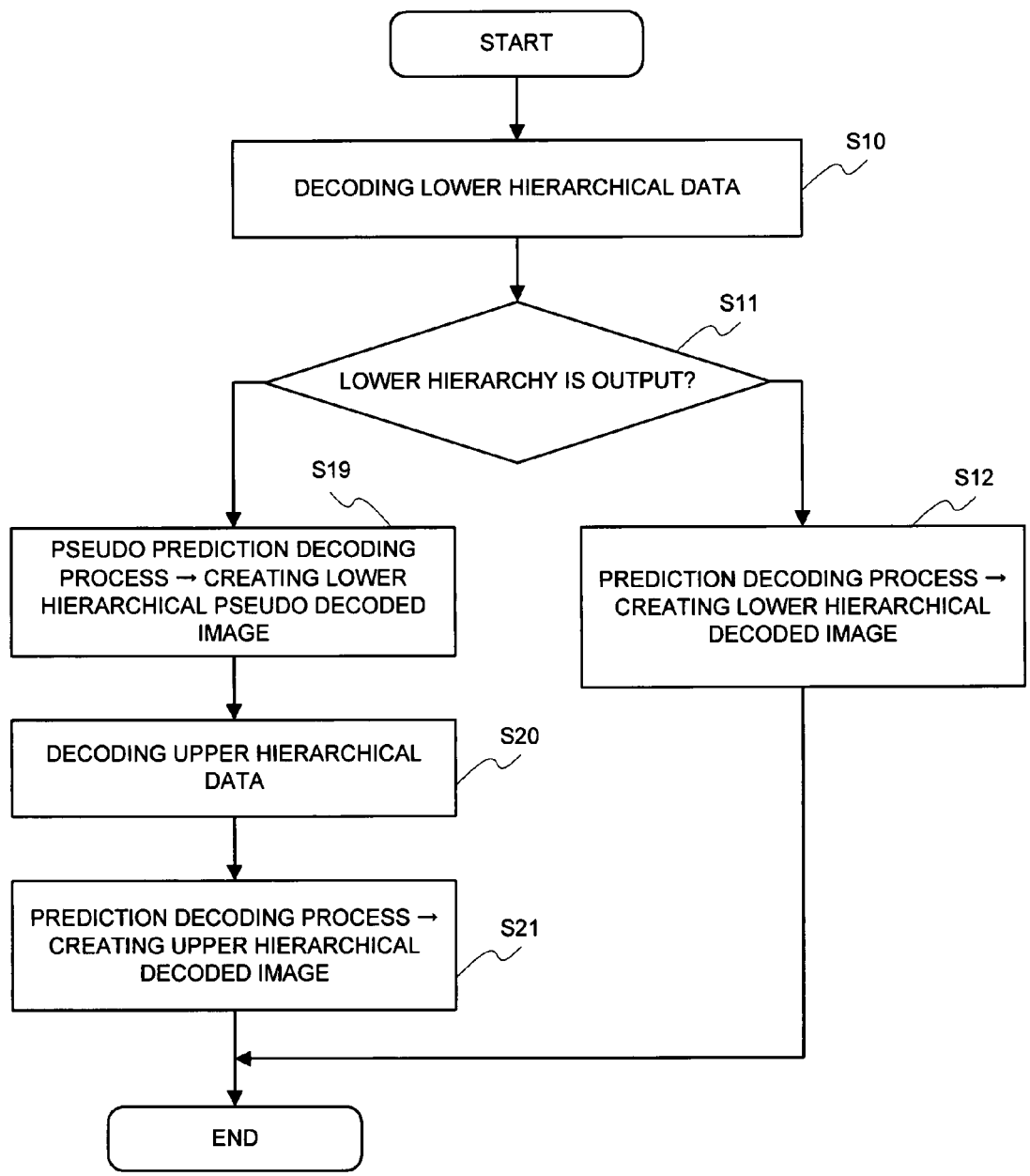
FIG. 2 is a flowchart illustrating an operation of the best mode for carrying out the present invention.

FIG. 2 is a flowchart illustrating a flow of a process up to the output of the decoded image in the image decoding device shown in FIG. 1. All operations of this embodiment will be explained by employing FIG. 1 and FIG. 2.

The lower hierarchical decoder 100 decodes lower hierarchical data 1001, and creates a prediction error signal 1004 (S10 of FIG. 2). The switch 107 accepts a decoding hierarchy instruction signal 1100 indicating which of the upper and lower hierarchies the hierarchical image decoding device decodes, and switches the prediction decoding process (S11 of FIG. 2). In a case of decoding the lower hierarchy, the switch 107 inputs a lower hierarchical decoded image 1009, which becomes an output, into the prediction decoding unit 105. A prediction signal 1007 that the prediction decoding unit 105 outputs, and the prediction error signal 1004 are added, and a lower hierarchical decoded image 1009 is created (S12 of FIG. 2).

In a case of outputting the upper hierarchy, the switch 107 inputs a lower hierarchical decoded image 1009, which becomes an output, into the pseudo prediction decoding unit 106. A pseudo prediction signal 1008 that the pseudo prediction decoding unit 106 outputs, and the prediction error signal 1004 are added, and a lower hierarchical decoded image 1009 is created (S19 of FIG. 2). The upper hierarchical decoder 200 creates a prediction error signal 2004 with the upper hierarchical data 2001 assumed to be an input (S20 of FIG. 2). After the prediction decoding unit 205 outputs a prediction signal 2007 by making a reference to an upper hierarchical decoded image 2008, which becomes an output, and the lower hierarchical decoded image 1009, it adds the prediction error signal 2004 hereto to create an upper hierarchical decoded image 2008 (S21 of FIG. 2).

In this embodiment, the processing quantity can be reduced because a configuration is made so that not the prediction decoding unit 105, but the pseudo prediction decoding unit 106 works in decoding the upper hierarchy.

EXAMPLE 1

Next, the best mode for carrying out the present invention will be explained by employing a specific example.

Figure 3:
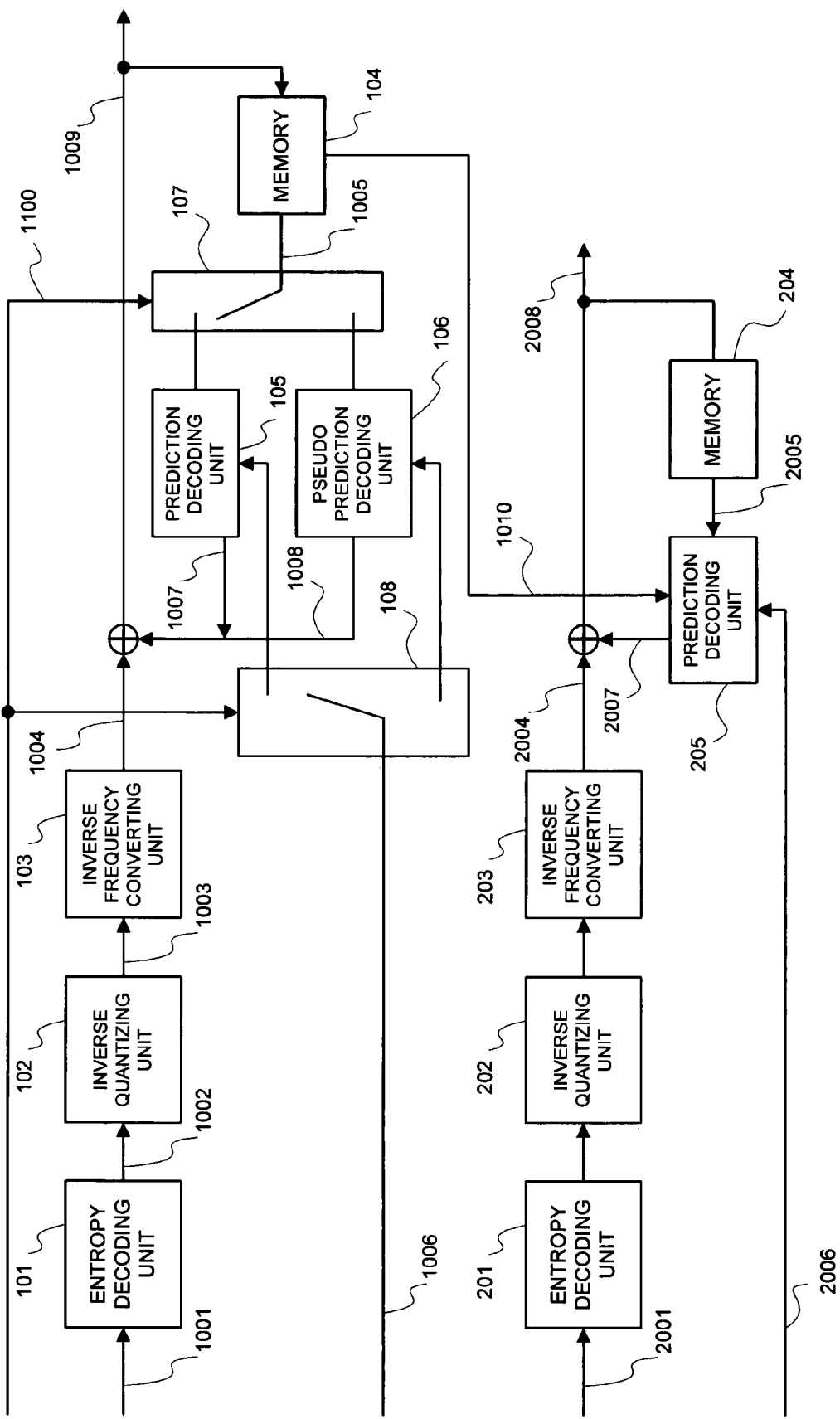
FIG. 3 is a block diagram illustrating a configuration of the image decoding device, being a specific example of the present invention.

FIG. 3 is a block diagram illustrating a configuration of the image decoding device, being an example of the present invention. The image decoding device in FIG. 3 is comprised of entropy decoding units 101 and 201, inverse quantizing units 102 and 202, inverse frequency converting units 103 and 203, memories 104 and 204, prediction decoding units 105 and 205, a pseudo prediction decoding unit 106, and switches 107 and 108. Additionally, the lower hierarchical decoder 100 in FIG. 1 is comprised of the entropy decoding unit 101, the inverse quantizing unit 102, and the inverse frequency converting unit 103. Further, the upper hierarchical decoder 200 in FIG. 1 is comprised of the entropy decoding unit 201, the inverse quantizing unit 202, and the inverse frequency converting unit 203.

Next, a detailed operation of the example in the present invention will be explained by employing FIG. 3.

The entropy decoding unit 101 entropy-decodes the lower hierarchical data 1001, and creates a quantization coefficient signal 1002. The inverse quantization unit 102 inverse-quantizes the quantization coefficient signal 1002, and creates a coefficient signal 1003. The inverse frequency converting unit 103 performs an inverse frequency conversion for the coefficient signal 1003, and creates a prediction error signal 1004.

The switch 107 switches an output destination of the lower hierarchical decoded image 1005 filed in the memory 104 responding to the hierarchy being output by making a reference to a decoding hierarchy instruction signal 1100.

Further, the switch 108 switches an output destination of additional information 1006, which is employed for a prediction decoding process, responding to the hierarchy being output by making a reference to the decoding hierarchy instruction signal 1100. In a case of outputting the lower hierarchy, the switch 107 outputs the lower hierarchical decoded image 1005 and the additional information 1006 to the prediction decoding unit 105. The prediction decoding unit 105 performs a prediction decoding process, and creates a prediction signal 1007. The prediction signal 1007 and the prediction error signal 1004 are added, and a lower hierarchical decoded image 1009, which becomes an output, is created. The lower hierarchical decoded image 1009, which is filed into the memory 104, is employed for the later decoding.

The movement compensating process, which is performed by making a reference to the already-decoded frame, and the intra-frame interpolating process, which is performed by making a reference to the already-decoded neighboring pixels within the identical frame, are employed as a prediction decoding process. The prediction decoding unit 105 performs any of the prediction decoding processes according to a signal for determination that is included in the additional information 1006. In a case where the movement compensating process is performed as a prediction decoding process, the prediction decoding unit 105 makes a reference to information for specifying a frame to which a reference is made, division information of a small block, being a unit with which the movement compensating process is performed for the above block, and movement information indicating a movement of each small block as the additional information 1006. The movement information has a precision of one pixel or less such as a ½ unit and a ¼ unit. In this case, the pixel value is interpolated from the adjacent pixels to create the prediction signal. In a case where the intra-frame predicting process is performed as a prediction decoding process, the prediction decoding unit 105 makes a reference to prediction direction information indicating a direction, for example, a horizontal direction, a vertical direction, and an oblique direction, in which the neighboring pixels are copied for filling up the block, as the additional information 1006.

In a case of outputting the upper hierarchy, the switch 107 outputs the lower hierarchical decoded image 1005 and the additional information 1006 to the pseudo decoding unit 106. The pseudo prediction decoding unit 106 performs the simplified prediction decoding process, and creates a pseudo prediction signal 1008. The pseudo prediction signal 1008 and the prediction error signal 1004 are added to create a lower hierarchical decoded image 1009, which is filed in the memory 104.

In a case where the movement compensating prediction is employed as a simplified prediction decoding process, it is thinkable to replace the interpolation filter, which corresponds to movement information of a decimal pixel unit, with a filter having a short tap length, or a filter for realizing the arithmetic operation with an integral arithmetic operation. Or, the process of rounding off the movement information of a decimal pixel unit to an integral pixel position can be considered.

Further, with the intra-frame predicting process, it is thinkable to replace the interpolation filter in copying the neighboring pixels in an oblique direction with a filter having a short tap length, or a filter that is realized with an integral arithmetic operation. Or, it is thinkable to replace it with another intra-frame predicting process of which an arithmetic operation quantity is few.

Next, the entropy decoding unit 201, the inverse quantizing unit 202, and the inverse frequency converting unit 203 perform a process for the upper hierarchical data 2001, respectively, and create a prediction error signal 2004. The prediction decoding unit 205 performs a prediction decoding process by making a reference to the lower hierarchical decoded image 1010 filed into the memory 104, the upper hierarchical decoded image 2005 filed into the memory 204, and the additional information 2006, and creates a prediction signal 2007. There exists the process of carrying out the up-sampling onto the resolution identical to that of the upper hierarchical decoded image as a prediction decoding process employing the lower hierarchical decoded image. The prediction signal 2007 and the prediction error signal 2004 are added, and an upper hierarchical decoded image 2008 is created. The upper hierarchical decoded image 2008, which is filed in the memory 204, is employed for later decoding.

Additionally, in this example, the case that the number of the hierarchy was two was explained; however the present invention is also applicable to the case that the number of the hierarchy is three or more. In this case, the high-quality imaging filter is simplified in a hierarchy lower than the hierarchy that becomes an output.

In this embodiment of the present invention explained above, the prediction decoding process of the lower hierarchy is simplified or is not performed in outputting the upper hierarchy. In a case of outputting the lower hierarchical image, various distortions of the decoded images exert an influence upon a decline in a quality of the output image. However, in a case where the lower hierarchical decoded image is referenced in decoding the upper hierarchy, various distortions of the lower hierarchical decoded images do not exert an influence upon a decline in a quality of the output image relatively. In particular, in a case where the resolution of the lower hierarchy differs from that of the upper hierarchy, the distortion is attenuated owing to the magnifying process that is performed for the lower hierarchy, and hence the influence upon the image quality of the output image is alleviated.

Further, applying the present invention to the encoding device or technique, which correspond to the image decoding device or method, allows a decline in a quality of the output image to be suppressed furthermore. By employing the simplified prediction decoding process for the lower hierarchical decoding process, which is locally performed in intra-encoding, in encoding the upper hierarchical image, the lower hierarchical decoded image, which is referenced in the upper hierarchy by the encoding side, coincides with the lower hierarchical decoded image, which is referenced in the upper hierarchy by the decoding side. This makes it possible to realize a reduction in the processing quantity of the image decoding device without bringing a large distortion to the upper hierarchical decoded image.

In addition hereto, as apparent from the foregoing explanation, it is also possible to configure the present invention with hardware, and it is also possible to realize it with a computer program.

In this case, a program for allowing an operation similar to that of each section described above to be performed is filed into a program memory, and a processor, which operates under control of this program, performs a process similar to the foregoing example.

The invention claimed is:

1. An image decoding method of decoding hierarchized image data, comprising:
   in decoding a lower hierarchy,
      performing a prediction decoding process based on already-decoded image data and creating a prediction signal and a prediction error signal,
      adding said prediction signal and said prediction error signal and creating a first lower hierarchical decoded image; and
   in decoding an upper hierarchy,
      performing a simple pseudo prediction decoding process based on said already-decoded image data and creating a pseudo prediction signal,
      adding said pseudo prediction signal and said prediction error signal and creating a second lower hierarchical decoded image, and
      decoding upper hierarchical decoding data based on said second lower hierarchical decoded image.

2. The image decoding method according to claim 1, wherein the prediction decoding process is a process of performing movement compensation prediction decoding based on a reference frame and movement information indicating a migration quantity for each block between a frame that becomes an object of decoding and said reference frame, wherein the reference frame is an already-decoded image frame.

3. The image decoding method according to claim 1, wherein:
   the prediction decoding process is a process of performing movement compensation prediction decoding based on a reference frame and movement information indicating a migration quantity for each block between a frame that becomes an object of decoding and said reference frame, wherein the reference frame is an already-decoded image frame; and
   the pseudo prediction decoding process is a process of, after rounding off movement information indicating a decimal pixel position to an integral pixel position, performing movement compensation prediction decoding.

4. The image decoding method according to claim 1, wherein:
   the prediction decoding process is a process of performing movement compensation prediction decoding based on a reference frame and movement information indicating a migration quantity for each block between a frame that becomes an object of decoding and said reference frame, wherein the reference frame is an already-decoded image frame; and
   the pseudo prediction decoding process is a process of employing an interpolation filter having a shorter tap length instead of a pixel value interpolation filter in the movement compensation prediction decoding.

5. The image decoding method according to claim 1, wherein the prediction decoding process is a process of performing a pixel value interpolating process for a block, which becomes an object of decoding, by making a reference to pixels neighboring said block, creating an interpolated pixel value, and copying said interpolated pixel value into said block.

6. The image decoding method according to claim 1, wherein:
the prediction decoding process is a process of performing a pixel value interpolating process for a block, which becomes an object of decoding, by making a reference to pixels neighboring said block, creating an interpolated pixel value, and copying said interpolated pixel value into said block; and
the pseudo prediction decoding process is a process of employing another pixel value interpolating process of which an arithmetic operation quantity is fewer than that of the pixel value interpolating process.

7. A hierarchical image decoding method of decoding hierarchized image data, said image decoding method comprising:
a step of filing a lower hierarchical decoded image into a first memory;
a first entropy decoding step of entropy-decoding lower hierarchical data;
a first inverse quantizing step of inverse-quantizing an output of said first entropy decoding step;
a first inverse frequency converting step of performing an inverse frequency conversion for an output of said first inverse quantizing step, and creating a first prediction error signal;
a first prediction decoding step of performing a prediction decoding process based on the lower hierarchical decoded image filed into said first memory and first additional information, and creating a first prediction signal;
a pseudo prediction decoding step of performing a simple pseudo prediction decoding process based on the lower hierarchical decoded image filed into said first memory and said first additional information, and creating a pseudo prediction signal;
a first switching step of selecting any of said first prediction decoding step and said pseudo prediction decoding step for said lower hierarchical decoded image by making a reference to a decoding hierarchy instruction signal for giving an instruction as to which of the upper and lower hierarchies is decoded;
a second switching step of selecting any of said first prediction decoding step and said pseudo prediction decoding step for said additional information by making a reference to said decoding hierarchy instruction signal;
a first adding step of adding one of said first prediction signal and said pseudo prediction signal, and said first prediction error signal, and creating a lower hierarchical decoded image;
a step of filing an upper hierarchical decoded image into a second memory;
a second entropy decoding step of entropy-decoding upper hierarchical data;
a second inverse quantizing step of inverse-quantizing an output of said second entropy decoding step;
a second inverse frequency converting step of performing an inverse frequency conversion for an output of said second inverse quantizing step, and creating a second prediction error signal;
a second prediction decoding step of performing a prediction decoding process based on the lower hierarchical decoded image filed into said first memory, the upper hierarchical decoded image filed into said second memory and second additional information, and creating a second prediction signal; and
a second adding step of adding said second prediction signal and said second prediction error signal, and creating an upper hierarchical decoded image, wherein:
in a case the lower hierarchical image is an output image, performing said first prediction decoding step; and
in a case the upper hierarchical image is an output image, performing said pseudo prediction decoding step, creating an lower hierarchical pseudo decoded image, and making a reference to said lower hierarchical pseudo decoded image in the upper hierarchical decoding process.

8. An image decoding device for decoding hierarchized image data, comprising:
A first means for, in decoding a lower hierarchy, performing a prediction decoding process based on by already-decoded image data and creating a prediction signal and a prediction error signal, adding said prediction signal and said prediction error signal and creating a first lower hierarchical decoded image; and
A second means for, in decoding an upper hierarchy, performing a simple pseudo prediction decoding process based on said already-decoded image data and creating a pseudo prediction signal, adding said pseudo prediction signal and said prediction error signal and creating a second lower hierarchical decoded image, and decoding upper hierarchical decoding data based on said second lower hierarchical decoded image.

9. The image decoding device according to claim 8, wherein the prediction decoding process is a process of performing movement compensation prediction decoding based on a reference frame and movement information indicating a migration quantity for each block between a frame that becomes an object of decoding and said reference frame, wherein the reference frame is an already-decoded image frame.

10. The image decoding device according to claim 8, wherein:
the prediction decoding process is a process of performing movement compensation prediction decoding based on a reference frame and movement information indicating a migration quantity for each block between a frame that becomes an object of decoding and said reference frame, wherein the reference frame is an already-decoded image frame; and
the pseudo prediction decoding process is a process of, after rounding off movement information indicating a decimal pixel position to an integral pixel position, performing movement compensation prediction decoding.

11. The image decoding device according to claim 8, wherein:
the prediction decoding process is a process of performing movement compensation prediction decoding based on a reference frame and movement information indicating a migration quantity for each block between a frame that becomes an object of decoding and said reference frame, wherein the reference frame is an already-decoded image frame; and
the pseudo prediction decoding process is a process of employing an interpolation filter having a shorter tap length instead of a pixel value interpolation filter in the movement compensation prediction decoding.

12. The image decoding device according to claim 8, wherein the prediction decoding process is a process of performing a pixel value interpolating process for a block, which becomes an object of decoding, by making a reference to pixels neighboring said block, creating an interpolated pixel value, and copying said interpolated pixel value into said block.

13. The image decoding device according to claim 8, wherein:
the prediction decoding process is a process of performing a pixel value interpolating process for a block, which becomes an object of decoding, by making a reference to pixels neighboring said block, creating an interpolated pixel value, and copying said interpolated pixel value into said block; and
the pseudo prediction decoding process is a process of employing another pixel value interpolating process of which an arithmetic operation quantity is fewer than that of the pixel value interpolating process.

14. A hierarchical image decoding device for decoding hierarchized image data, said image decoding device comprising:
a first memory for filing a lower hierarchical decoded image;
a first entropy decoding means for entropy-decoding lower hierarchical data;
a first inverse quantizing means for inverse-quantizing an output of said first entropy decoding means;
a first inverse frequency converting means for performing an inverse frequency conversion for an output of said first inverse quantizing means, and creating a first prediction error signal;
a first prediction decoding means for performing a prediction decoding process based on the lower hierarchical decoded image filed into said first memory and first additional information, and creating a first prediction signal;
a pseudo prediction decoding means for performing a simple pseudo prediction decoding process based on the lower hierarchical decoded image filed into said first memory and said first additional information, and creating a pseudo prediction signal;
a first switching means for inputting said lower hierarchical decoded image into one of said first prediction decoding means and said pseudo prediction decoding means by making a reference to a decoding hierarchy instruction signal for giving an instruction as to which of the upper and lower hierarchies is decoded;
a second switching means for inputting said additional information into one of said first prediction decoding means and said pseudo prediction decoding means by making a reference to said decoding hierarchy instruction signal;
a first adding means for adding one of said first prediction signal and said pseudo prediction signal, and said first prediction error signal, and creating a lower hierarchical decoded image;
a second memory for filing upper hierarchical decoded image;
a second entropy decoding means for entropy-decoding upper hierarchical data:
a second inverse quantiziting means for inverse-quantizing an output of said second entropy decoding means;
a second inverse frequency converting means for performing an inverse frequency conversion for an output of said second inverse quantizing means, and creating a second prediction error signal;
a second prediction decoding means for performing a prediction decoding process based on the lower hierarchical decoded image filed into said first memory, the upper hierarchical decoded image filed into said second memory and second additional information, and creating a second prediction signal; and
a second adding means for adding said second prediction signal and said second prediction error signal, and creating an upper hierarchical decoded image, wherein:
in a case the lower hierarchical image is an output image, said first prediction decoding means performs a process; and
in a case the upper hierarchical image is an output image, said pseudo prediction decoding means performs a process to create an lower hierarchical pseudo decoded image, and makes a reference to said lower hierarchical pseudo decoded image in the upper hierarchical decoding process.

15. A non-transitory computer-readable medium containing instructions for decoding hierarchized image data, the instructions comprising:
in decoding a lower hierarchy, performing a prediction decoding process based on already-decoded image data and creating a prediction signal and a prediction error signal, adding said prediction signal and a said prediction error signal and creating a first lower hierarchical decoded image; and
in decoding an upper hierarchy, performing a simple pseudo prediction decoding process based on said already-decoded image data and creating a pseudo prediction signal, adding said pseudo prediction signal and said prediction error signal creating a second lower hierarchical decoded image, and decoding upper hierarchical decoding data based on said second lower hierarchical decoded image.

* * * * *